United States Patent
Eide et al.

(10) Patent No.: US 8,909,528 B2
(45) Date of Patent: Dec. 9, 2014

(54) METHOD AND SYSTEM FOR PROMPT CONSTRUCTION FOR SELECTION FROM A LIST OF ACOUSTICALLY CONFUSABLE ITEMS IN SPOKEN DIALOG SYSTEMS

(75) Inventors: Ellen Marie Eide, Tarrytown, NY (US); Vaibhava Goel, Elmsford, NY (US); Ramesh Gopinath, Millwood, NY (US); Osamuyimen T. Stewart, Piscataway, NJ (US)

(73) Assignee: Nuance Communications, Inc., Burlington, MA (US)

(*) Notice: Subject to any disclaimer, the term of this patent is extended or adjusted under 35 U.S.C. 154(b) by 1374 days.

(21) Appl. No.: 11/746,087

(22) Filed: May 9, 2007

(65) Prior Publication Data

US 2008/0281598 A1    Nov. 13, 2008

(51) Int. Cl.
| | |
|---|---|
| G10L 15/00 | (2013.01) |
| G10L 15/02 | (2006.01) |
| G10L 15/20 | (2006.01) |
| G10L 15/24 | (2013.01) |
| G10L 15/28 | (2013.01) |
| G10L 15/22 | (2006.01) |
| G10L 15/187 | (2013.01) |

(52) U.S. Cl.
CPC ............ G10L 15/22 (2013.01); G10L 15/187 (2013.01)
USPC .......... 704/251; 704/231; 704/257; 704/260; 704/270; 704/270.1; 704/243; 704/252; 704/255; 704/E15.021; 704/E15.024

(58) Field of Classification Search
CPC ..... G10L 15/1815; G10L 15/19; G10L 15/22; G10L 15/1822; G10L 15/187; G10L 15/065; G10L 15/18; G10L 15/265; G06F 17/2765; G06F 17/2881
USPC .............. 704/270, 270.1, 246, 257, 251, 256, 704/255, 9, 243, E15.021, E15.024
See application file for complete search history.

(56) References Cited

U.S. PATENT DOCUMENTS

| | | | | |
|---|---|---|---|---|
| 5,845,245 A | * | 12/1998 | Gupta et al. | 704/231 |
| 5,855,000 A | * | 12/1998 | Waibel et al. | 704/235 |
| 5,864,805 A | * | 1/1999 | Chen et al. | 704/235 |
| 5,909,667 A | * | 6/1999 | Leontiades et al. | 704/275 |
| 5,987,414 A | * | 11/1999 | Sabourin et al. | 704/270 |
| 6,018,708 A | * | 1/2000 | Dahan et al. | 704/244 |
| 6,044,347 A | * | 3/2000 | Abella et al. | 704/272 |

(Continued)

OTHER PUBLICATIONS

Krahmer et al. "Error detection in Spoken Human-Machine Interaction", International Journal of Speech Technology, vol. 4, 2001.*

(Continued)

*Primary Examiner* — Pierre-Louis Desir
*Assistant Examiner* — Abdelali Serrou
(74) *Attorney, Agent, or Firm* — Wolf, Greenfield & Sacks, P.C.

(57) ABSTRACT

A method (and system) of determining confusable list items and resolving this confusion in a spoken dialog system includes receiving user input, processing the user input and determining if a list of items needs to be played back to the user, retrieving the list to be played back to the user, identifying acoustic confusions between items on the list, changing the items on the list as necessary to remove the acoustic confusions, and playing unambiguous list items back to the user.

24 Claims, 2 Drawing Sheets

(56) References Cited

U.S. PATENT DOCUMENTS

| | | | |
|---|---|---|---|
| 6,192,110 B1* | 2/2001 | Abella et al. | 379/88.01 |
| 6,230,132 B1* | 5/2001 | Class et al. | 704/270 |
| 6,314,397 B1* | 11/2001 | Lewis et al. | 704/235 |
| 6,581,033 B1* | 6/2003 | Reynar et al. | 704/231 |
| 6,714,631 B1* | 3/2004 | Martin et al. | 379/88.02 |
| 7,146,383 B2* | 12/2006 | Martin et al. | 1/1 |
| 7,162,422 B1* | 1/2007 | Bennett | 704/236 |
| 7,443,960 B2* | 10/2008 | Martin et al. | 379/88.02 |
| 7,499,861 B2* | 3/2009 | Danieli et al. | 704/275 |
| 8,185,399 B2* | 5/2012 | Di Fabbrizio et al. | 704/275 |
| 8,768,969 B2* | 7/2014 | Huerta et al. | 707/797 |
| 2002/0138265 A1* | 9/2002 | Stevens et al. | 704/251 |
| 2003/0014255 A1* | 1/2003 | Steingrubner et al. | 704/270 |
| 2003/0033146 A1* | 2/2003 | Morin et al. | 704/251 |
| 2003/0105634 A1* | 6/2003 | Abella et al. | 704/257 |
| 2003/0233230 A1* | 12/2003 | Ammicht et al. | 704/235 |
| 2004/0024601 A1* | 2/2004 | Gopinath et al. | 704/270 |
| 2004/0088285 A1* | 5/2004 | Martin et al. | 707/3 |
| 2004/0161094 A1* | 8/2004 | Martin et al. | 379/218.01 |
| 2005/0080628 A1* | 4/2005 | Kuperstein | 704/270.1 |
| 2005/0125232 A1* | 6/2005 | Gadd | 704/270.1 |
| 2005/0209853 A1* | 9/2005 | Davis et al. | 704/249 |
| 2006/0010138 A1* | 1/2006 | Huerta et al. | 707/100 |
| 2006/0122979 A1* | 6/2006 | Kapur et al. | 707/3 |
| 2006/0149555 A1* | 7/2006 | Fabbrizio et al. | 704/275 |
| 2006/0235690 A1* | 10/2006 | Tomasic et al. | 704/257 |
| 2006/0235691 A1* | 10/2006 | Tomasic et al. | 704/257 |
| 2007/0005369 A1* | 1/2007 | Potter | 704/275 |
| 2007/0213979 A1* | 9/2007 | Meermeier | 704/231 |

OTHER PUBLICATIONS

Swerts et al., "Correction in spoken dialogue systems", Sixth International Conference on Spoken Language, 2001.*

Suhm et al., "Multimodal error correction for speech user interfaces", ACM Trans. on Computer-Human Interfaces, vol. 8, No. 1, Mar. 2001.*

McTear, "Spoken Dialogue Technology: Enabling the Conversational User Interface", ACM computing Surveys, vol. 34, No. 1, Mar. 2002.*

* cited by examiner

METHOD AND SYSTEM FOR PROMPT CONSTRUCTION FOR SELECTION FROM A LIST OF ACOUSTICALLY CONFUSABLE ITEMS IN SPOKEN DIALOG SYSTEMS

BACKGROUND OF THE INVENTION

1. Field of the Invention

The present invention generally relates to spoken dialog systems, and more particularly to a method and apparatus for constructing prompts that allow an un-ambiguous presentation of confusable list items to a user.

2. Description of the Related Art

In spoken dialog systems, sometimes there are dialog states where users have to make a selection from a list of items. These lists are often dynamic, obtained as a result of a database query. To present the list choices to the user, a prompt is constructed with these items and is played back to the user by the system. However, if the list items are homophones (acoustically similar) an obvious problem arises for users to distinguish between them and select the correct item.

An example of such a dialog system is a name dialing system that allows users to say the name of the person they wish to call. These systems sometimes have a disambiguation feature. In a disambiguation feature, if for some user utterance the ASR returns more than one hypothesis, all having nearly equal confidence values, the system prompts the caller with these choices and asks them to select one from the list. For example, "did you say Jeff Kuo, Jeff Guo, or Jeff Gao?" Systems that have such disambiguation naturally run into the issue of constructing an un-ambiguous prompt since the list items arise due to their being acoustically confusable.

There is currently no conventional known solution to this problem.

SUMMARY OF THE INVENTION

In view of the foregoing and other exemplary problems, drawbacks, and disadvantages of the conventional methods and structures, an exemplary feature of the present invention is to provide a method and structure to determine if items in a list are confusable, and if the items are deemed confusable then providing a method to construct a prompt that allows an unambiguous presentation of those items to the user.

In accordance with a first aspect of the present invention, a method (and system) of determining a confusable list item in a spoken dialog system includes receiving user input, processing the user input and determining if a list of items needs to be played back to the user, retrieve the list to be played back to the user, identify acoustic confusions between items on the list, changing the items on the list as necessary to remove the acoustic confusions, and playing unambiguous list items back to the user.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
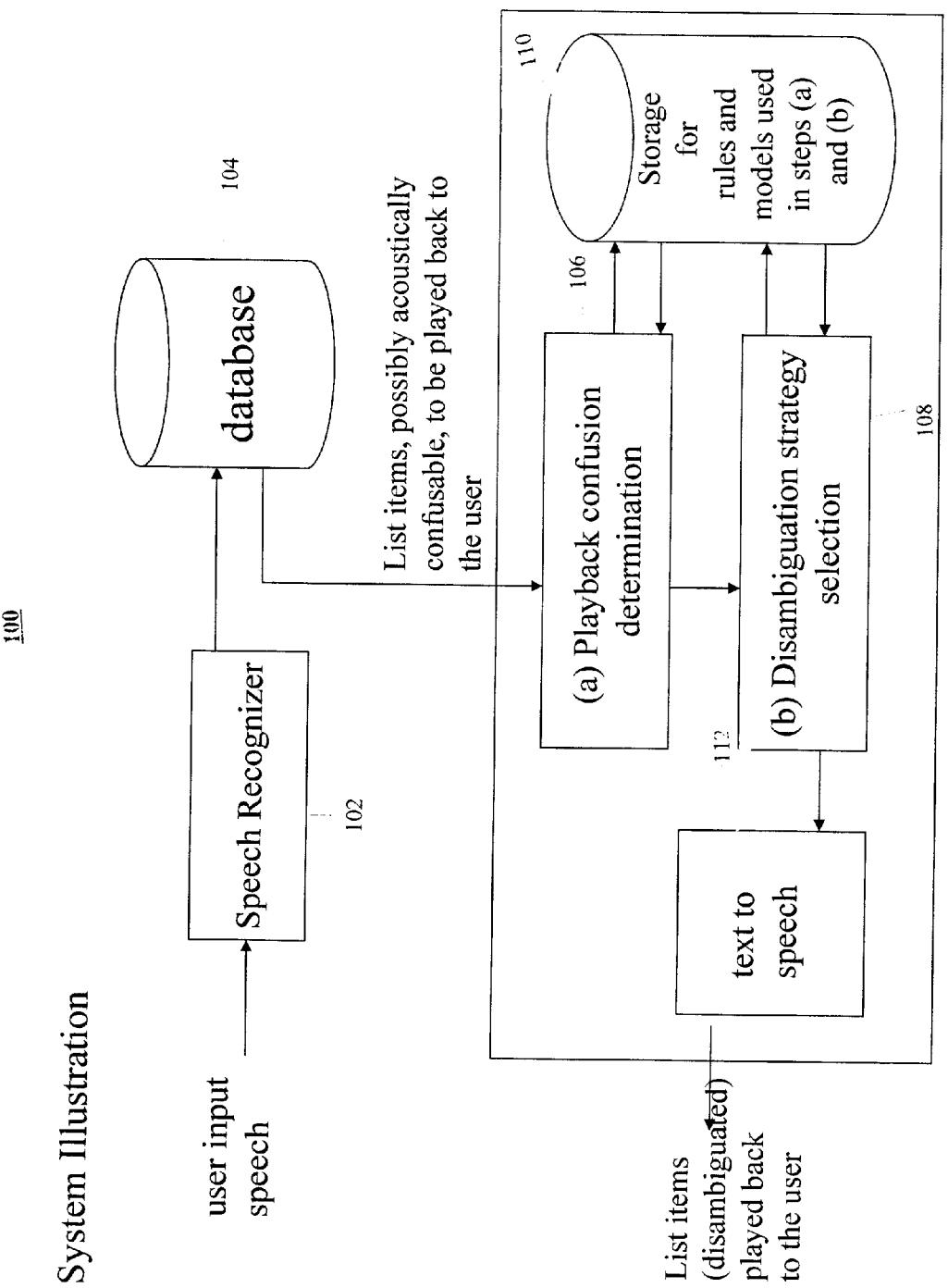
FIG. 1 illustrates a system 100 in accordance with an exemplary embodiment of the present invention.
Figure 2:
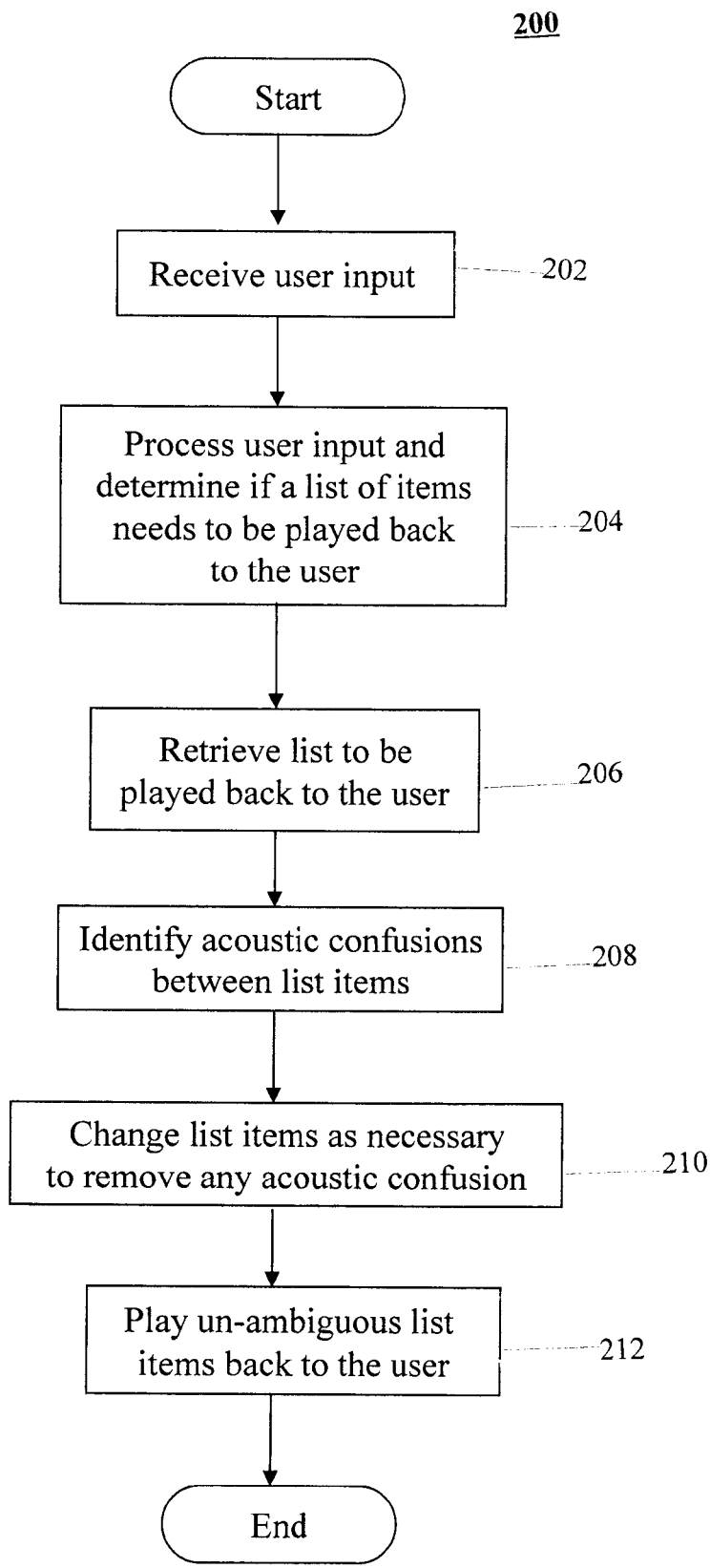
FIG. 2 illustrates a method 200 in accordance with an exemplary embodiment of the present invention.

Referring now to the drawings, and more particularly to FIGS. 1 and 2, there are shown exemplary embodiments of the method and structures according to the present invention.

Certain embodiments of the present invention are directed to a method (and system) of determining if list items are confusable, and if they are deemed confusable then a method of constructing a prompt that would allow an unambiguous presentation of those list items to the user.

The method of the present invention includes two components, a procedure for determining if items are confusable and framework for constructing prompts to distinguish items.

There are several possible embodiments for determining if items are confusable. For example, a measure of "playback confusability" between list items could be constructed based on the phonetic contents or orthography of these items.

This confusability measure could be further customized to the playback system (the particular text-to-speech system) so as to resolve the confusions that are specific to that system. Alternatively, the method can look at commonly occurring recognition errors in previous calls. This would also provide a way of automatically learning which items need clarification.

The framework for constructing prompts to distinguish items essentially works by determining 'minimal' (fastest, most natural, most pleasant sounding, etc.) features that can distinguish the confusable list items. The minimal feature set may depend on the type of confusion. For example, Jeff Kuo and Jeff Guo may be resolved by spelling the last name, so the prompt may be "did you say Jeff Kuo K U O or Jeff Guo G U O?". If the names are too long to spell, e.g. in Jeff Krochamer and Jeff Grochamer, the prompt could be "did you say Jeff Krochamer with a K or Jeff Grochamer with a G?". For letters that sound like other letters we could say "S as in Sunday, F as in Frank, F as in Frank, N as in Nancy". Some other confusion may be quickly resolved by simply emphasizing the distinctive part.

This framework also takes into account the number of list items that are considered confusable and chooses its disambiguation strategy accordingly. Additionally, the present invention can learn the minimal features and disambiguation strategies for different types of confusion. Such learning could be carried out on a hand annotated set of confusable items and the prompt markup that makes them distinct. Such learning could also be carried out by keeping track of user interactions with the system and observing the effectiveness of various approaches and observing how users resolve various types of confusions.

A system 100 of the present invention is exemplarily illustrated in FIG. 1. The system 100 includes a speech recognizer 102, which recognizes user input speech, a database 104, which contains list items, a playback confusion determination unit 106, a disambiguation strategy selection unit 108, a storage 110 for rules and models used in the playback confusion determination unit 106 and the disambiguation strategy selection unit 108, a text to speech unit 112.

A method 200 of the present invention is exemplarily illustrated in FIG. 2. The method 200 includes receiving user input (e.g., 202), processing said user input and determining if a list of items needs to be played back to the user (e.g., 204), retrieve said list to be played back to the user (e.g, 206) identify acoustic confusions between items on said list (e.g., 208), changing said items on said list as necessary to remove said acoustic confusions (e.g., 210) and playing unambiguous list items back to the user (e.g., 212).

A typical hardware configuration of an information handling/computer system in accordance with the invention preferably has at least one processor or central processing unit (CPU).

The CPUs are interconnected via a system bus to a random access memory (RAM), read-only memory (ROM), input/output (I/O) adapter (for connecting peripheral devices such as disk units and tape drives to the bus), user interface adapter (for connecting a keyboard, mouse, speaker, microphone, and/or other user interface device to the bus), a communication adapter for connecting an information handling system to a data processing network, the Internet, an Intranet, a personal area network (PAN), etc., and a display adapter for connecting the bus to a display device and/or printer (e.g., a digital printer or the like).

In addition to the system and method described above, a different aspect of the invention includes a computer-implemented method for performing the above method. As an example, this method may be implemented in a computer system environment.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette, directly or indirectly accessible by the CPU. Whether contained in the diskette, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of providing a list of items in a spoken dialog system comprising a plurality of disambiguation strategies, said method comprising:
   receiving input speech;
   processing said input speech to determine if a clarification of the input speech is desired because the spoken dialog system has returned at least two speech recognition hypotheses having similar confidence values for at least a portion of the input speech;
   retrieving, if clarification is desired, a first list of items to be played back to the user;
   identifying acoustically confusable items on said first list of items using at least one measure of confusability;
   selecting, based, at least in part, on at least one rule in a collection of rules of the spoken dialog system, a disambiguation strategy from the plurality of disambiguation strategies, wherein at least two of the disambiguation strategies in the plurality of disambiguation strategies each includes presenting at least two choices to the user and asking the user to select one of the at least two choices, wherein the plurality of disambiguation strategies includes a first disambiguation strategy comprising spelling at least a portion of each of at least two of the items in the first list of items and a second disambiguation strategy comprising repeating at least two of the items in the first list of items and identifying a first letter of a word in each of the at least two of the items;
   generating a disambiguated list of items by modifying at least one of said acoustically confusable items on said first list according to said selected disambiguation strategy; and
   playing a prompt comprising the disambiguated list of items back to the user.

2. The method according to claim 1, wherein the at least one measure of confusability is based on phonetic content of said items on the first list of items.

3. The method according to claim 2, wherein said at least one measure of confusability is customized to a playback system to resolve acoustically confusable items specific to the playback system.

4. The method according to claim 1, further comprising:
   identifying commonly occurring recognition errors in previous calls; and
   wherein the at least one measure of confusability is based, at least in part, on the commonly occurring recognition errors.

5. The method according to claim 1, wherein said disambiguation strategy is selected based on minimal features that distinguish the acoustically confusable items.

6. The method according to claim 1, wherein the disambiguation strategy is selected based on a type of acoustic confusion between the acoustically confusable items.

7. The method according to claim 1, wherein said disambiguation strategy is selected based on a quantity of said acoustically confusable items.

8. A system comprising:
   at least one storage medium configured to store a plurality of machine-readable instructions; and
   at least one processor programmed to execute the plurality of machine-readable instructions to perform a method comprising;
   processing input speech to determine if clarification of the input speech is desired because the spoken dialog system has returned at least two speech recognition hypotheses having similar confidence values for at least a portion of the input speech;
   retrieving, if clarification is desired, a first list of items to be played back to the user;
   identifying acoustically confusable items on the first list of items using at least one measure of confusability;
   selecting, based, at least in part, on at least one rule in a collection of rules, a disambiguation strategy from a plurality of disambiguation strategies, wherein of the plurality of disambiguation strategies includes a first disambiguation strategy comprising spelling at least a portion of each of at least two of the items in the first list of items and a second disambiguation strategy comprising repeating at least two of the items in the first list of items and identifying a first letter of a word in each of the at least two of the items;

generating a disambiguated list of items by modifying at least one of the acoustically confusable items on the first list according to the disambiguation strategy; and playing a prompt comprising the disambiguated list of items back to the user.

9. The system of claim 8, wherein the at least one measure of confusability is based on phonetic content of said items on the first list of items.

10. The system of claim 8, wherein the at least one measure of confusability is customized to a playback system to resolve acoustically confusable items specific to the playback system.

11. The system of claim 8, wherein the method further comprises:

identifying commonly occurring recognition errors in previous calls; and wherein the at least one measure of confusability is based, at least in part, on the commonly occurring recognition errors.

12. The system of claim 8, wherein the disambiguation strategy is selected based on minimal features to distinguish the acoustically confusable items.

13. The system of claim 8, wherein the disambiguation strategy is selected based on a type of acoustic confusion between the acoustically confusable items.

14. The system of claim 8, wherein the disambiguation strategy is selected based on a quantity of the acoustically confusable items.

15. At least one non-transitory computer-readable storage medium encoded with a plurality of machine-readable instructions that, when executed by a computer perform a method comprising:

processing input speech to determine if clarification of the input speech is desired because the spoken dialog system has returned at least two speech recognition hypotheses having similar confidence values for at least a portion of the input speech;

retrieving, if clarification is desired, a first list of items to be played back to the user;

identifying acoustically confusable items on the first list of items using at least one measure of confusability;

selecting, based, at least in part, on at least one rule in a collection of rules, a disambiguation strategy from a plurality of disambiguation strategies, wherein the disambiguation strategy is selected based on a type of acoustic confusion between the acoustically confusable items on the first list of items, wherein the plurality of disambiguation strategies includes a first disambiguation strategy comprising spelling at least a portion of each of at least two of the items in the first list of items and a second disambiguation strategy comprising repeating at least two of the items in the first list of items and identifying a first letter of a word in each of the at least two of the items;

generating a disambiguated list of items by modifying at least one of the acoustically confusable items on the first list according to the disambiguation strategy; and playing a prompt comprising the disambiguated list of items back to the user.

16. The at least one computer-readable storage medium of claim 15, wherein the at least one measure of confusability is based on phonetic contents of said items on the first list of items.

17. The at least one computer-readable storage medium of claim 15, wherein the at least one measure of confusability is customized to a playback system to resolve acoustically confusable items specific to the playback system.

18. The at least one computer-readable storage medium of claim 15, wherein the at least one processor is further programmed to:

identify commonly occurring recognition errors in previous calls; and wherein the at least one measure of confusability is based, at least in part, on the commonly occurring recognition errors.

19. The at least one computer-readable storage medium of claim 15, wherein the disambiguation strategy is selected based on minimal features to distinguish the acoustically confusable items.

20. The method of claim 1, wherein the at least one measure of confusability is based on orthography of said items on the first list of items.

21. The system of claim 8, wherein the at least one measure of confusability is based on orthography of said items on the first list of items.

22. The at least one computer-readable storage medium of claim 15, wherein the at least one measure of confusability is based on orthography of said items on the first list of items.

23. The method of claim 1, further comprising:

selecting one of the at least two of the disambiguation strategies in the plurality of disambiguation strategies that includes presenting at least two choices to the user and asking the user to select one of the at least two choices.

24. The system of claim 8, wherein the first disambiguation strategy further comprises spelling at least a portion of each of the items in the first list of items and asking the user to select one of the spelled items.

* * * * *